Patented Jan. 30, 1940

2,188,420

UNITED STATES PATENT OFFICE 2,188,420

RUBBER VULCANIZATION

Waldo L. Semon, Silver Lake, Ohio, assignor to The B. F. Goodrich Company, New York, N. Y., a corporation of New York No Drawing. Application October 13, 1937, Serial No. 168,753

15 Claims. (Cl. 260—787)

This invention relates to the art of rubber manufacture and has as its chief object to provide materials which will activate organic accelerators of vulcanization, thereby decreasing the heating time required to produce fully cured rubber compositions. Other objects are to increase the tensile strength of the vulcanized products, and to secure satisfactory vulcanization with smaller amounts of accelerators.

I have discovered that quaternary ammonium salts of aliphatic monocarboxylic acids are very good activators for a wide variety of organic accelerators. Many different quaternary ammonium salts may be reacted with aliphatic monocarboxylic acids such as acetic acid, butyric acid, oleic acid, palmitic acid, linoleic acid, ricinoleic acid, stearic acid, etc., to produce the activators of this invention. The acidic portion preferably contains not more than twenty carbon atoms, although higher carboxylic acids may be used. Suitable quaternary ammonium salts include those formed by reacting hexamethylenetetramine, hexaethylidenetetramine, triethanolamine, trimethylamine, morpholines, quinolines, pyridines, acridines, etc., with alkyl or aralkyl halides such as methyl iodide or benzyl chloride, halogenated ketones such as 1-chlor 2-butanone, and halogenated thiazoles such as 2-chlorbenzothiazole and 6-nitro-2 chlor-benzothiazole. Activators which are particularly useful include tetramethylammonium oleate and trimethylphenyl ammonium oleate.

Illustrative of the organic accelerators with which the activators of this invention may be used are guanidines such as diphenyl guanidine and di-ortho-tolyl guanidine, mercaptothiazoles such as mercaptobenzothiazole, thiuram sulfides and polysulfides such as tetramethylthiuram sulfide and tertamethylthiuram disulfide, aldehyde-amine condensation products such as polybutylidene-aniline, ketone-amine condensation products such as acetone-aniline, thioureas, dithiocarbamates, and thioacids.

As a specific example of one modification of my invention, I will show the activation of polybutylidene-aniline with tetramethyl ammonium oleate. The following compositions were prepared:

| Composition | A | B |
|---|---|---|
| Rubber | 100 | 100 |
| Zinc oxide | 5 | 5 |
| Sulfur | 2 | 2 |
| Polybutylidene-aniline | 0.3 | 0.3 |
| Oleic acid | 0.5 | |
| Tetramethylammonium oleate | | 0.63 |

When the compositions were cured in a press at various temperatures, the following results were obtained:

| Temperature (F.) | Minutes cure | Tensile, lbs./sq. in. | Elongation, percent | Tensile | Elongation |
|---|---|---|---|---|---|
| 220 | 120 | 565 | 1050 | 1565 | 960 |
| 260 | 15 | 380 | 1010 | 1635 | 895 |
| 260 | 45 | 2425 | 845 | 3350 | 780 |
| 260 | 90 | 3195 | 770 | 3740 | 755 |
| 260 | 120 | 3525 | 755 | 3865 | 755 |

It can be readily seen that the activator produces a remarkable improvement not only in the speed of vulcanization but also in the tensile strengths developed.

As a second example, I will show the activation of a mercaptothiazole by tetramethyl ammonium oleate. The following compositions were prepared:

| Compositions | A | B | C |
|---|---|---|---|
| Rubber | 100 | 100 | 100 |
| Zinc oxide | 8 | 8 | 8 |
| Carbon black | 36.5 | 36.5 | 36.5 |
| Sulfur | 3 | 3 | 3 |
| Mercaptobenzothiazole | 1.2 | 1.2 | 0.6 |
| Oleic acid | 2.0 | 1.0 | 1.0 |
| Tetramethylammonium oleate | | 1.25 | 1.25 |

When the compositions were cured in a press at various temperatures, the following tensile strengths were obtained.

| Temperature (F.) | Minutes cure | Tensile strength in lbs./sq. in. | | |
|---|---|---|---|---|
| | | A | B | C |
| 220 | 60 | 525 | 4160 | 4550 |
| 220 | 120 | 1540 | 4660 | 4610 |
| 260 | 30 | 2660 | 4570 | 4415 |
| 260 | 45 | 3420 | 4665 | 4005 |
| 260 | 60 | 4000 | 4515 | 4310 |
| 260 | 75 | 4135 | 4580 | 4320 |

In the above tests, the mercaptobenzothiazole was reduced by half (Composition C), and excellent cures were still obtained in a relatively short time.

Similar excellent results may be obtained by using other activators of this invention in conjunction with the above or other organic accelerators.

It is to be understood that the specific examples given above are merely illustrative of the use of one of the activators of this invention; that other activators within the scope of the class herein defined may be substituted for the specific compounds used in the examples; that the activators of this invention may be used in conjunction with organic accelerators to vulcanize rubber broadly, including caoutchouc, balata, guttapercha, synthetic rubber, or natural or artificially prepared latex; that the activators may be incorporated in the rubber by mastication or milling, or in the case of latex or other dispersion or solution, by simply dissolving or suspending therein; that the activators may be used in admixture with antioxidants, softeners, pigments, fillers, etc., and that the rubber may be vulcanized with the asistance of this new class of activators in other manners than that particularly set forth above; specifically, it may be vulcanized in hot air, steam, hot water, etc. The activators may be advantageously employed in small proportions, usually not more than 2% of the rubber in the compositions. Amounts as high as 5% or over may be used, however.

The scope of this invention is accordingly not to be limited to the specific examples herein set forth, but it is to be limited only as required by the prior art and as indicated in the appended claims.

I claim:

1. The process which comprises vulcanizing rubber in the presence of an organic accelerator and a quaternary ammonium salt of an aliphatic monocarboxylic acid.

2. The process which comprises vulcanizing rubber in the presence of a quaternary ammonium salt of an aliphatic monocarboxylic acid and an organic accelerator of the class consisting of mercaptothiazoles, thiuram sulfides, guanidines, and aldehyde-amine condensation products.

3. The process which comprises vulcanizing rubber in the presence of an organic accelerator and a quaternary ammonium salt of oleic acid.

4. The process which comprises vulcanizing rubber in the presence of an organic accelerator and a tetraalkylammonium salt of an aliphatic monocarboxylic acid.

5. The process which comprises vulcanizing rubber in the presence of an organic accelerator and tetramethylammonium oleate.

6. The process which comprises vulcanizing rubber in the presence of mercaptobenzothiazole and tetramethylammonium oleate.

7. The process which comprises vulcanizing rubber in the presence of polybutylidene-aniline and tetramethylammonium oleate.

8. The process which comprises vulcanizing rubber in the presence of an organic accelerator of vulcanization and a quaternary ammonium salt of an aliphatic monocarboxylic acid, the pentavalent nitrogen atom containing at least one aryl group.

9. The process which comprises vulcanizing rubber in the presence of an organic accelerator and a trialkyl-aryl-ammonium salt of an aliphatic monocarboxylic acid.

10. The process which comprises vulcanizing rubber in the presence of a mercaptothiazole and a trialkyl-phenyl ammonium salt of oleic acid.

11. The process which comprises vulcanizing rubber in the presence of mercaptobenzothiazole and trimethyl-phenyl ammonium oleate.

12. A rubber composition which has been vulcanized in the presence of an organic accelerator and a quaternary ammonium salt of an aliphatic monocarboxylic acid.

13. A rubber composition which has been vulcanized in the presence of mercaptobenzothiazole and tetramethylammonium oleate.

14. A rubber composition which has been vulcanized in the presence of an organic accelerator and tetramethylammonium oleate.

15. A rubber composition which has been vulcanized in the presence of an organic accelerator and trimethyl-phenyl ammonium oleate.

WALDO L. SEMON.